Dec. 1, 1925.
H. L. BYRD
1,563,963
DRYING AND HEATING APPARATUS
Filed July 10, 1925
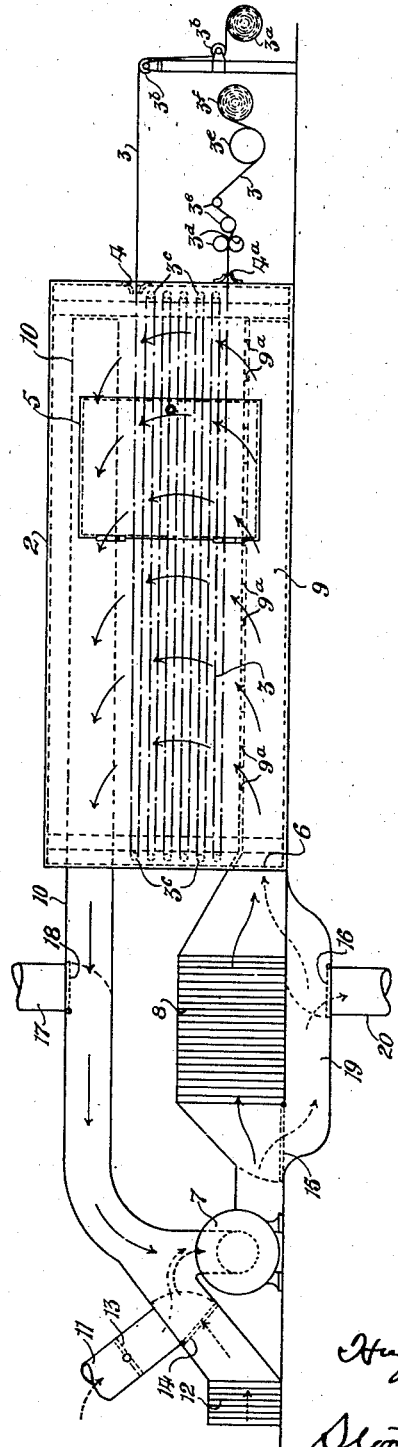
Inventor:
Hugh L. Byrd
by
Stockbridge & Borst
Attys Patented Dec. 1, 1925.

1,563,963

UNITED STATES PATENT OFFICE.

HUGH LINLEY BYRD, OF STOCKPORT, ENGLAND.

DRYING AND HEATING APPARATUS.

Application filed July 10, 1925. Serial No. 42,743.

*To all whom it may concern:*

Be it known that I, HUGH LINLEY BYRD, a subject of the King of Great Britain and Ireland, and a resident of Stockport, in the county of Chester, England, have invented certain new and useful Improvements in or Relating to Drying and Heating Apparatus (for which I have filed an application in Great Britain Dec. 17, 1923), of which the following is a specification.

This invention has reference to drying and heating apparatus of the kind wherein air is heated and its humidity is regulated before it enters a chamber wherein the materials are treated, the air being circulated through a heating element and the chamber by a blower which may draw a supply of air direct from atmosphere or through a pre-heating element, and the air pipes or trunks being valve or otherwise controlled so as to divert the hot air current to and from the chamber through the heater or not as desired.

The invention has for its object to provide an improved apparatus of the kind referred to for treating textile and fibrous materials either in the piece or as yarn or in a loose and more or less natural state, and particularly adapted for treating dyed and sized yarn and fabrics, which may be cooled more rapidly and easily than has hitherto been possible so that an operative may enter the chamber sooner than can be done at present.

According to the invention a drying and heating apparatus of the kind referred to, comprises a treating chamber, a heating element external to the chamber, a blower also external to the chamber, controlled passages whereby air may be drawn direct from atmosphere or through a pre-heater, or both, into said blower and may be passed into and circulated through the chamber by way of the heating element or past the heating element, or partly through and partly past, said element, and controlled openings to said chamber whereby air may be admitted thereinto from atmosphere to effect rapid cooling of the chamber and contents, such air being drawn out and blown to atmosphere by the blower.

The accompanying drawing exemplifies in diagrammatic side elevation, partly in section, one embodiment of the invention in an apparatus adapted for treating textile fabrics in the piece.

Referring to the drawing, 2 is the chamber in which the fabric 3 is treated. The fabric 3 is drawn from a roll $3^a$ and passes over guide pulleys $3^b$, into the chamber through an opening 4 in the end wall thereof, thence zig-zag fashion over a plurality of rollers $3^c$ and out of the chamber through an opening $4^a$ and then between tension rollers $3^d$ and over guide rollers $3^e$ to a roll $3^f$ on which it is wound. One or more doors 5 is or are provided in the wall or walls of the chamber for giving access thereinto, and the chamber is covered with any suitable insulating material to prevent the escape of hot air and loss of heat.

The chamber is provided with an inlet 6 for the admission of hot air. The air is forced into the chamber by a blower 7 situated outside of the chamber, and in passing from the blower the air flows over or through a heating element or attemforator 8 which heats the air and regulates the humidity thereof. The heating element or radiator and humidifier 8 may be of any appropriate construction. The air may escape into the chamber directly from the inlet 6 but is preferably distributed throughout the length of the chamber by means of one or more trunks 9 provided with a plurality of openings $9^a$.

At the top of the chamber there is or are provided one or more apertured outlet trunks 10 leading to the suction side of the blower 7 so that when the latter is in action a continuous circulation of air from the blower, through the heater or radiator and humidifier 8, and through the chamber 2 back to the blower, as indicated by the arrows shown in full lines, can be effected.

The suction side of the blower is also connected to atmosphere directly by means of a branch 11 and indirectly through a pre-heater 12 and valves 13 and 14 are provided to control the admission of air through the branch 11 and the pre-heater 12 so that fresh air may be introduced into the system directly from atmosphere through the branch 11 or through the pre-heater 12 or through both the branch and the pre-heater as indicated by arrows shown in dotted lines. The outlet trunk 10 is provided with a vent 17 controlled by a valve 18 for the escape of a portion of the air from the system when fresh air is introduced thereinto.

A by-passage 19 is provided round the heater or radiator and humidifier 8 and is fitted with a valve 15 by the appropriate operation of which the whole or any desired portion of the air from the blower may be by-passed round the device 8. The by-passage 19 is also fitted with a valve 16 in order that for rapidly cooling the chamber 2 cold air drawn thereinto by way of the door or doors 5 may be passed by the blower to atmosphere by way of the passage 19, the valve 16 and a branch 20. Alternatively, for rapidly cooling the chamber 2, cold air drawn by the blower from atmosphere through the branch 11 may be by-passed by the passage 19 into the chamber and pass to atmosphere by way of the vent 17.

What I claim as my invention and desire to secure by Letters Patent is:—

Drying and heating apparatus comprising a treating chamber, a heating element external to said chamber, a blower also external to said chamber, a by-passage round said heating element, and valve controlled passages, whereby during the drying operation air can be circulated through said heating element and the chamber, or can be wholly or in part by-passed past the heating element and circulated through the chamber, and fresh air can be introduced into the system and a portion of the whole of the used air returned to atmosphere; and for rapidly cooling the chamber air can be drawn from atmosphere, passed through the chamber, and then returned to atmosphere.

In witness whereof I have hereunto set my hand.

HUGH LINLEY BYRD.